US008009763B2

(12) United States Patent
Risk et al.

(10) Patent No.: US 8,009,763 B2
(45) Date of Patent: Aug. 30, 2011

(54) METHOD AND APPARATUS FOR EQUALIZING A HIGH SPEED SERIAL DATA LINK

(75) Inventors: Gabriel Risk, San Francisco, CA (US);
Dawei Huang, San Diego, CA (US);
Drew Doblar, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 758 days.

(21) Appl. No.: 12/061,217

(22) Filed: Apr. 2, 2008

(65) Prior Publication Data

US 2009/0252212 A1    Oct. 8, 2009

(51) Int. Cl.
*H04K 1/02* (2006.01)
*H04L 25/03* (2006.01)
*H04L 25/49* (2006.01)

(52) U.S. Cl. .................................................... 375/296
(58) Field of Classification Search ............... 375/229, 375/285, 296, 353, 224
See application file for complete search history.

(56) References Cited

U.S. PATENT DOCUMENTS

| | | | | | |
|---|---|---|---|---|---|
| 4,170,715 A | * | 10/1979 | Mizokawa | ..................... | 375/292 |
| 4,283,788 A | * | 8/1981 | Tamburelli | ..................... | 375/232 |
| 5,526,360 A | * | 6/1996 | Kraft | ............................. | 370/535 |
| 5,576,634 A | * | 11/1996 | Kamiya | ........................... | 326/26 |
| 5,594,762 A | * | 1/1997 | Joo et al. | ...................... | 375/371 |
| 6,335,955 B1 | * | 1/2002 | Knotts | ........................... | 375/354 |
| 6,339,489 B1 | * | 1/2002 | Bruyere et al. | ............... | 398/147 |
| 6,384,622 B2 | * | 5/2002 | Verhaeghe et al. | ............ | 326/30 |
| 6,473,886 B2 | * | 10/2002 | Kitamura | ...................... | 327/267 |
| 6,992,516 B2 | * | 1/2006 | Yeh | ................................ | 327/175 |
| 7,061,283 B1 | * | 6/2006 | Ghia et al. | .................... | 327/108 |
| 7,269,212 B1 | * | 9/2007 | Chau et al. | .................... | 375/229 |
| 7,532,665 B2 | * | 5/2009 | Akiyama et al. | ............. | 375/220 |

OTHER PUBLICATIONS

Author Unknown, "LTI System Theory", Wikipedia, http://en.wikipedia.org/wiki/LTI_system_theory, 14 pages, at least as early as Jan. 25, 2008.
Chunxing et al., "Statistical Eye Simulation and Modeling High-Speed Serial Links", Planet Analog, http://www.planetanalog.com/article, 11 pages, Feb. 26, 2007.
Hertz, Mike, International Engineering Consortium, http://www.iec.org, vol. 2, 4 pages, Aug. 2007.

* cited by examiner

*Primary Examiner* — Jean B Corrielus
(74) *Attorney, Agent, or Firm* — Polsinelli Shughart, PC

(57) ABSTRACT

A method and apparatus for equalizing a reflection in a reflective high speed serial link. The method involves obtaining an amplitude and delay time of a compensating pulse that is transmitted in response to a pulse transmitted on the serial link. The apparatus comprises a programmable delay element and a driver stage configured to transmit a delayed and amplitude adjusted version of a pulse transmitted on the serial link. A method for equalizing a plurality of reflections in a reflective high speed serial link. The method involves obtaining an amplitude and delay time of a first compensating pulse and an amplitude and delay time of a second compensating pulse. The method further involves transmitting the first compensating and second compensating pulses in response to a pulse transmitted on the serial link.

20 Claims, 5 Drawing Sheets

METHOD AND APPARATUS FOR EQUALIZING A HIGH SPEED SERIAL DATA LINK

FIELD OF THE INVENTION

Aspects of the present invention relate to high speed serial data links. More particularly, aspects of the present invention relate to equalization of a high speed serial data link by transmitting compensating pulses to cancel out the effects of reflections caused by impedance discontinuities in the high speed link.

BACKGROUND

A receiver of a high speed serial data link may be subject to noise caused by impedance discontinuities caused by connectors, amongst other things. Such noise may limit the data rate of the link. As data rates continue to increase, the impedance discontinuities may cause reflections that occur many unit intervals after an initial transition occurs (e.g. when a pulse is transmitted). These reflections may result in significant inter-symbol interference to later transmitted bits, which interference may be difficult to compensate for at the receiver.

The prior art includes techniques to deal with interference. For example, decision feedback equalization (DFE) is one current receiver technique for removing such inter-symbol interference. However, DFE typically requires a significant amount of integrated circuit die area and power. Current DFE techniques require one tap for each unit interval of time to be compensated. Hundreds of taps may be required to equalize a 10 Gbps link having 3.5 ns of delay between the transmitter and receiver. In addition, current DFE techniques result in a significant latency hit because a bit must be equalized before its value is determined. Moreover, conventional equalization techniques at the transmitter side of the data link typically make use of the first few bits after the transmitted bit for equalization. That is, transmitter equalization typically cannot handle impedance discontinuities that cause reflections many unit intervals after a bit transition occurs. Hence, there is a need in the art for improved techniques to deal with noise, inter-symbol interference, reflections, and other problems encountered when using high speed serial data links.

SUMMARY

One aspect of the present invention involves a method for equalizing a reflection in a reflective high speed serial link. The method involves obtaining a delay time T for a compensating pulse, obtaining an amplitude A for the compensating pulse, and transmitting the compensating pulse, having an amplitude A, at a time T after a pulse is transmitted on the data link.

Another aspect of the present invention involves an apparatus for equalizing a reflection in a reflective high speed serial link. The apparatus includes a programmable delay element having an input port and an output port, the input port in electrical communication with a transmitter output of a transmitter of a high speed serial link. The apparatus further includes a driver stage having a driver input and a driver output, the driver input in electrical communication with the output port of the programmable delay element and the driver output in electrical communication with a channel input of a channel of the high speed serial link. The programmable delay element is configured to delay a pulse transmitted by the transmitter and forward the delayed pulse to the driver stage. The driver stage is configured to transmit a compensating pulse over the channel by adjusting an amplitude of the delayed pulse.

Another aspect of the present invention involves a method for equalizing a plurality of reflections in a reflective high speed serial link. The method involves obtaining a first delay time T1 for a first compensating pulse, obtaining a first amplitude A1 for the first compensating pulse, and transmitting the first compensating pulse, having an amplitude A1, at a time T1 after a pulse is transmitted on the data link. The method further involves obtaining a second delay time T2 for a second compensating pulse, obtaining a second amplitude A2 for the second compensating pulse, and transmitting the second compensating pulse, having an amplitude A2, at a time T2 after the pulse is transmitted on the data link.

DETAILED DESCRIPTION

One embodiment of the present invention may employ a programmable delay element and a driver stage to equalize reflected energy of a linear, time-invariant high speed serial data link. This equalization technique is relatively inexpensive to implement and typically does not add latency to the link. By transmitting waveforms designed to cancel unwanted reflected energy (equalizing the reflected energy), the high speed serial link may operate at higher data rates.

Figure 1:
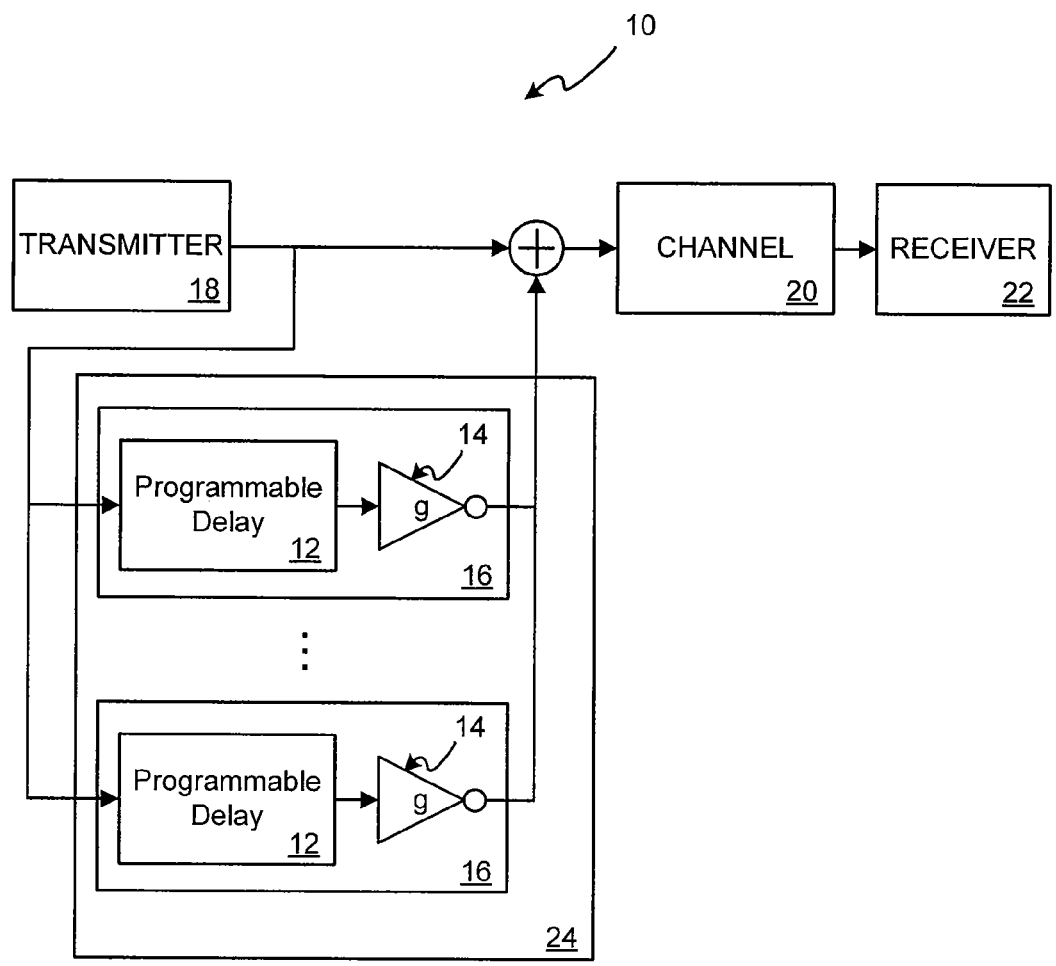
FIG. 1 depicts one embodiment of a high speed serial data link employing a programmable delay element and a driver stage to implement a floating tap finite impulse response equalizer.

FIG. 1 depicts one embodiment of a high speed serial data link 10 employing a programmable delay element 12 and a driver stage 14 to implement a floating tap finite impulse response (FIR) equalizer 16. The high speed serial data link 10 typically includes a transmitter 18, a channel 20 and a receiver 22. The high speed serial data link 10 typically obeys the fundamental laws governing linear, time-invariant systems. That is, the channel 20 may be modeled as a linear, time-invariant system. Channel linearity means that the relationship between the input and output of the channel 20 satisfies the superposition property. This means that if x(t), the input to the channel, is the sum of two component signals:

$$x(t) = a^* x_1(t) + b^* x_2(t),$$

then y(t), the output of the channel, will be:

$y(t) = a^* y_1(t) + b^* y_2(t)$, where a and b are constants and $y_n(t)$ is the output resulting from the sole input $x_n(t)$.

Time invariance means that whether an input is applied to the channel now or T seconds from now, the output will be identical, except for a time delay of T seconds. That is, if the output due to input x(t) is y(t), then the output due to input x(t−T) is y(t−T).

Thus, for a linear, time-invariant channel, a pulse transmitted at any time over the channel will behave exactly the same as any other pulse transmitted over the channel, independent of prior pulses which have been transmitted over the channel. One embodiment makes use of the linear, time-invariant properties of channel 20 to send pulses at certain times to effectively cancel out the effects of reflections and noise in the high speed serial data link 10.

High speed signals traveling over the high speed serial data link 10 may be subject to signal reflections caused by impedance discontinuities. Such impedance discontinuities may be caused by various elements such as vias, connectors, trace impedance variations, cables and packages. Each impedance discontinuity typically results in reflected energy that may result in noise at the receiver 22. As data rates continue to increase, these impedance discontinuities may result in reflections that occur many bit times after an initial bit transition. These, reflections may cause significant inter-symbol interference that may be difficult to remove at the receiver.

One embodiment equalizes reflected energy by transmitting waveforms designed to cancel unwanted energy, allowing the link to operate at higher data rates. Because the channel is linear, time-invariant, a reflected pulse due to a discontinuity retains the basic shape of the initial transmitted pulse. That is, the reflected pulse is time delayed and is of lower amplitude due to loss in the channel but the basic shape remains the same. Therefore, a compensating pulse may be aligned with the reflected pulse at the transmitter to cancel out the reflected pulse so that no reflection is received at the receiver to cause inter-symbol interference.

It is to be appreciated that for a linear data link, the compensation may be determined based on bit transitions or based on when logic ones are sent. Even though certain channels (e.g., a channel employing differential signals) may send a logic zero with a certain waveform pattern, that pattern is contained in the waveform shape when a logic zero, logic one, and logic zeros are sent forever after the logic one on the channel. Thus, certain embodiments will be described based on bit patterns by way of illustration and not limitation.

Referring again to FIG. 1, the programmable delay element 12 and inverting gain stage 14 may be employed to create the floating tap 16 of a FIR equalizer 24. It is to be appreciated that multiple floating taps 16 may be employed to compensate for multiple reflections. The programmable delay element allows the compensating pulse to be delayed for many bit time periods (or unit intervals) after a logic one is sent, resulting in a floating tap FIR equalizer.

In one embodiment, the programmable delay element 12 may be programmed in unit intervals. That is, compensating pulses may be sent at bit intervals. At very high data rates, sending compensating pulses at bit intervals typically provides sufficient time delay resolution to cancel the reflected energy. Other embodiments may provide higher or lesser programmable delay resolution. The programmable delay may cover a delay range sufficient to compensate multiple reflections (i.e., a sufficient length of time to allow the channel 20 to reach a quiescent state after a pulse is sent). For example, a programmable delay of up to ten nanoseconds may be employed by one embodiment to equalize a channel twenty inches long with a channel delay of 175 picoseconds per inch that operates at a data rate of 10 Gbps. The channel has a typical delay of about 3.5 ns from the transmitter to the receiver. More generally, the maximum delay may be determined as $T_{Dmax}=t_d*L*R$, where $t_d$=channel propagation delay per inch, L=length of the channel (in inches) and R=number of reflections to be compensated. In some embodiments, the programmable delay may be determined in increments of unit intervals. Note that other embodiments may provide more or less overall delay.

Figure 2:
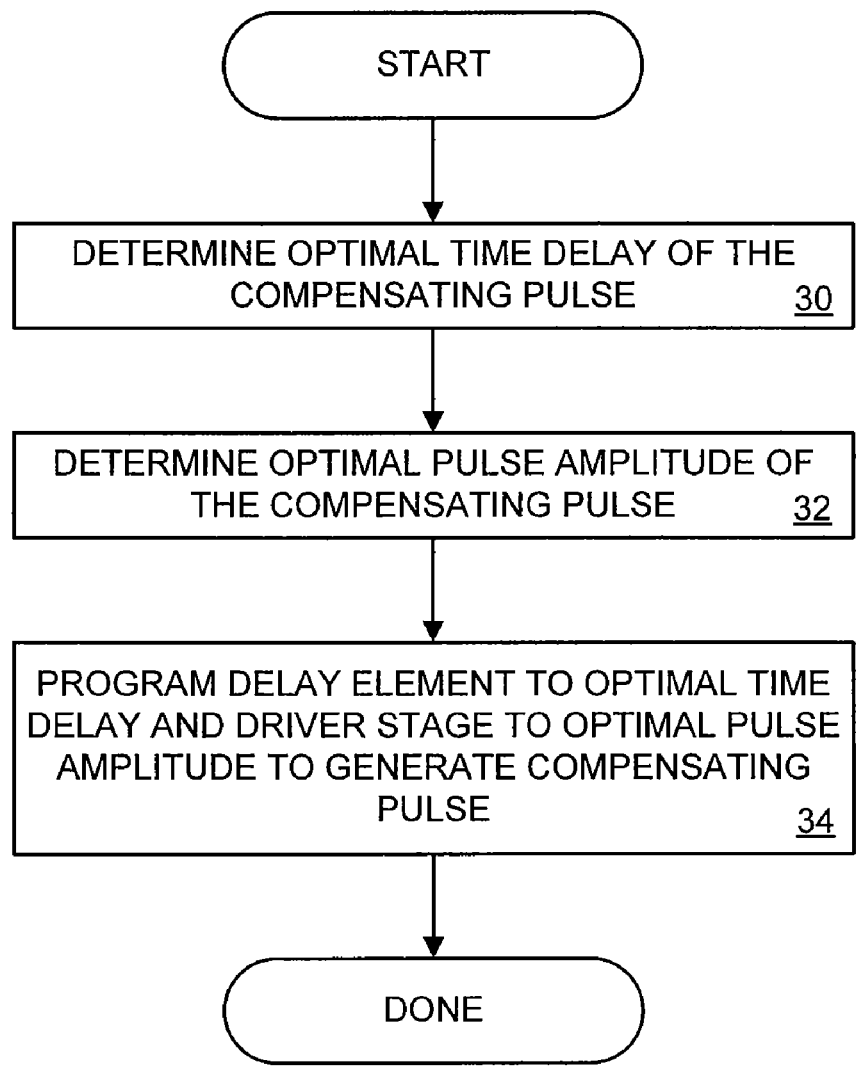
FIG. 2 depicts a flowchart illustrating one method for setting the programmable delay and amplitude of a compensating pulse generated by the high speed serial data link of FIG. 1.

FIG. 2 depicts a flowchart illustrating one method to set the delay and amplitude of a compensating pulse to equalize a reflection in a reflective high speed serial data link. Initially, operation 30 is performed. Operation 30 determines the optimal time delay T for the compensating pulse. Then, operation 32 is performed. It is to be appreciated that because the high speed serial data link is approximately a linear, time-invariant system, changing the amplitude of the compensating pulse generally does not affect the optimal time delay of the pulse and changing the time delay of the pulse generally does not affect the optimal pulse amplitude. Accordingly, the time delay and amplitude of the compensating pulse may be determined independently of each other and in any order.

Operation 32 determines the optimal pulse amplitude for the compensating pulse. In one embodiment, the gain may be adjustable in increments of 10 millivolts up to a maximum of about ten percent of the amplitude of the pulse transmitted on the data link.

Finally, operation 34 is performed. Operation 34 sets the programmable delay of delay element 12 to the optimal delay T and the gain of the gain stage 14 to the optimal amplitude. It is to be appreciated that because the channel is approximately linear and time-invariant, once the delay and gain have been set, data may be transmitted over the high speed serial data link without further adjustment. The equalizer automatically transmits a compensating pulse T seconds after a logic one is transmitted. (i.e., every time a logic one is transmitted, a compensating pulse is transmitted T seconds later to cancel out the reflected energy caused by an impedance discontinuity).

Figure 3:
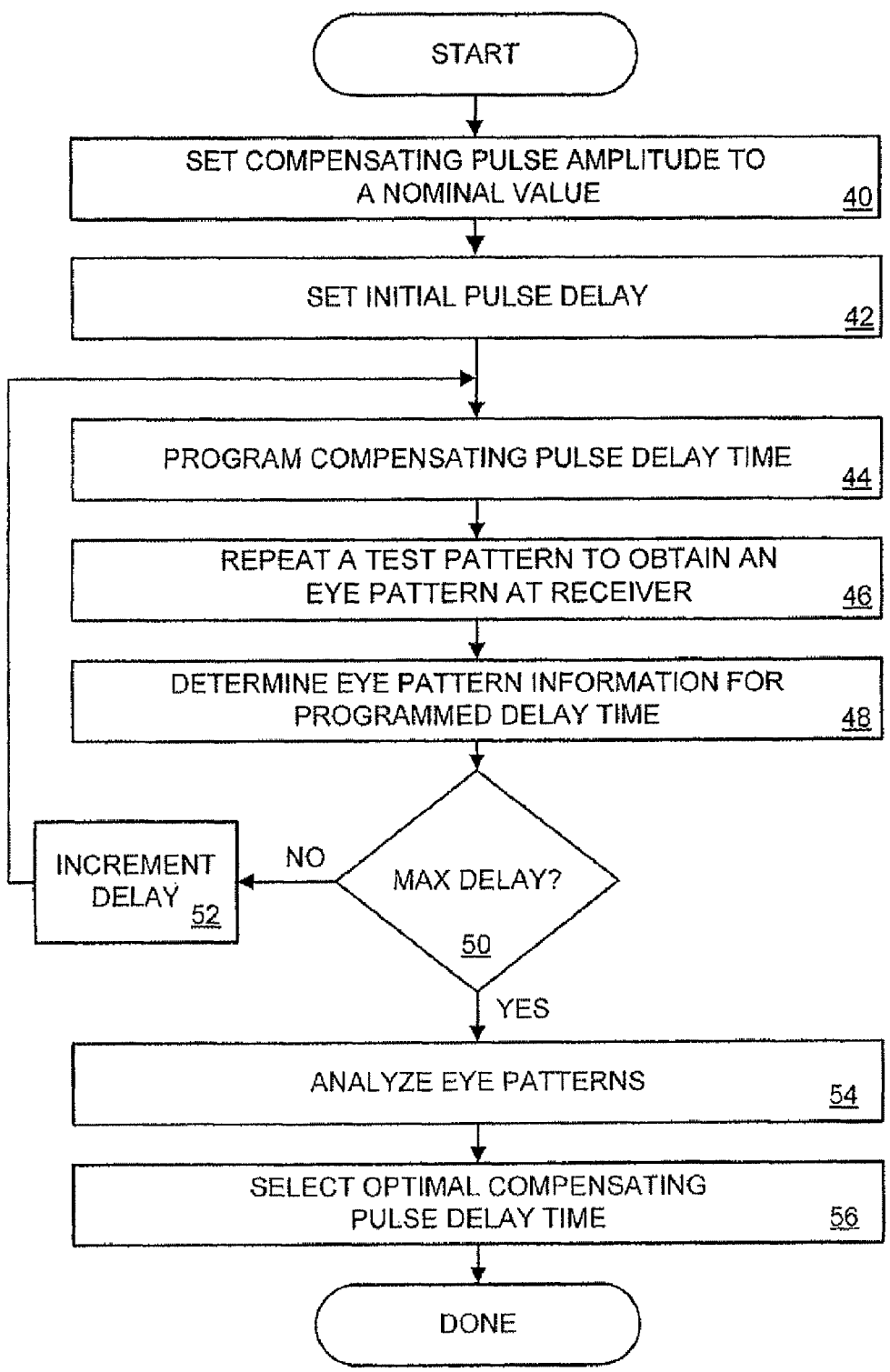
FIG. 3 depicts a flowchart illustrating one method for determining the optimal delay of a compensating pulse generated by the floating tap finite impulse response equalizer.

FIG. 3 depicts a flowchart illustrating one method for determining the optimal delay of a compensating pulse (operation 30 of FIG. 2). Initially, operation 40 is performed. Operation 40 sets the compensating pulse amplitude to a nominal value. In one embodiment, the nominal amplitude may be set to five percent of the amplitude of the pulse transmitted on the data link.

Then, operation 42 is performed. Operation 42 sets the delay value to a starting delay. In one embodiment, the starting delay is zero seconds. Then, operation 44 is performed. Operation 44 sets the programmable delay element to the desired compensating pulse delay time.

Next, in operation 46, the transmitter repeats a test pattern a sufficient number of times so that an eye pattern of the inter-symbol interference may be observed at the receiver. In one embodiment, the test pattern may be to send a single pulse (i.e., a bit pattern of 0000 . . . 0001000 . . . 000). The length of the test pattern may be set to allow multiple reflections to occur. For example, the channel being compensated may have a channel delay of about 175 picoseconds/inch and employ a test pattern with a length of about 525 picoseconds/inch to allow for three reflections (i.e., for a 20 inch channel, the test pattern would have a duration of about 10 nanoseconds).

An eye pattern is a multi-valued function that displays voltage as a function of time. The time window spanning the x axis is typically less that two unit intervals of a serial data stream. Subsequent data transitions are superimposed. An eye pattern may be used to determine both horizontal signal characteristics (e.g., eye width, jitter, rise time) and vertical attributes (e.g., eye height, eye amplitude, vertical noise). That is, the eye opening may be used in one embodiment to determine optimal delay and amplitude values. Alternatively, other embodiments may use pulse response metrics obtained from signal patterns to determine optimal delay and amplitude values. This may be done by using the receiver to capture an oversampled version of a pulse response (e.g., the output of the channel when a 0000 . . . 0001000 . . . 000 pattern is transmitted). That is, oversampled pulse responses may be captured by skewing the sampling time by a programmable amount. These responses may be overlaid at unit intervals to determine worst case jitter and eye opening parameters.

Once an eye pattern has been generated, operation 48 is performed. Operation 48 determines various eye pattern parameters for the eye pattern generated by the test pattern and the specified compensating pulse delay. One embodiment may determine the eye pattern width, height and amplitude. Other embodiments may determine more or fewer eye pattern parameters. These parameters may be stored.

Next, operation 50 determines if the current compensating pulse delay is equal to the maximum delay of the delay element. If the current compensating pulse delay is less than the maximum delay value, operation 52 is performed. Operation 52 increments the delay value. In one embodiment the delay increment may be equal to one unit interval (i.e., one bit period). Then, operation 44 is performed again.

If operation 50 determines that the current compensating pulse delay value is equal to the maximum delay value, operation 54 is performed. In operation 54 the eye pattern for each delay value is analyzed and a figure of merit is determined for each delay value.

Finally, operation 56 is performed. In operation 56 the optimal delay time is selected to maximize the figure of merit for the eye pattern observed at the receiver.

Figure 4:
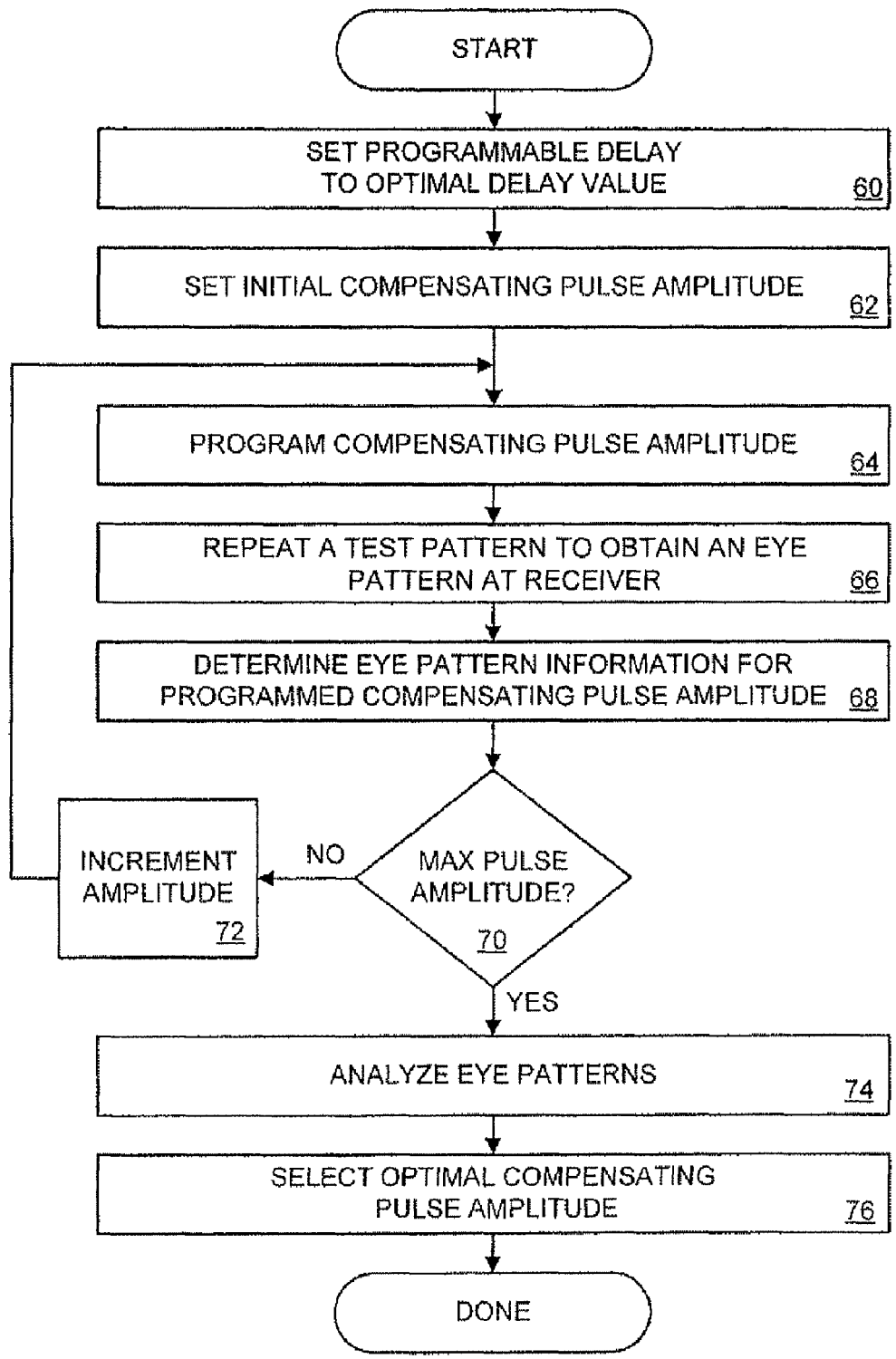
FIG. 4 depicts a flowchart illustrating one method for determining the optimal amplitude of a compensating pulse generated by the floating tap finite impulse response equalizer.

FIG. 4 depicts a flowchart illustrating one method for determining the optimal amplitude of the compensating pulse (operation 32 of FIG. 2). Initially, operation 60 sets the programmable delay of the delay element to the optimal delay determined by operation 56 of FIG. 3. It is to be appreciated that other embodiments may determine the optimal amplitude first. This may be done by setting the delay element to a nominal delay rather than to the optimal delay (e.g., the time delay for a pulse to travel from the transmitter to the receiver, be reflected, and travel back to the transmitter).

Then, operation 62 is performed. Operation 62 sets the compensating pulse amplitude to an initial starting value. In one embodiment, the initial pulse amplitude may be set to zero volts.

Next, operation 64 is performed. Operation 64 sets the amplitude of the compensating pulse to the selected value. Then, operation 66 is performed. In operation 66, the transmitter repeats a test pattern a sufficient number of times to generate an eye pattern of the inter-symbol interference at the receiver. In one embodiment, the test pattern may be a single pulse (i.e., the test pattern may be the same test pattern used to determine optimal delay). In one embodiment the test pattern may be repeated 100 times. In other embodiments, a different test pattern and/or different number of repetitions may be used to determine optimal pulse amplitude.

Then, operation 68 is performed. Operation 68 determines various eye pattern parameters for the current compensating pulse amplitude. Typically, the eye pattern parameters determined are the same eye pattern parameters as determined for pulse delay. The eye parameters for each pulse amplitude may be stored.

Then, operation 70 is performed. Operation 70 determines if the maximum compensating pulse amplitude has been reached. If operation 70 determines that the maximum pulse amplitude has not been reached, operation 72 is performed. Operation 72 increments the compensating pulse amplitude value. In one embodiment a pulse amplitude increment of 10 mV may be used. Then, operation 64 is performed.

If operation 70 determines that the maximum compensating pulse amplitude has been reached, operation 74 is performed. Operation 74 analyzes the parameters of the eye pattern generated for each compensating pulse amplitude and determines a figure of merit for each pulse amplitude.

Finally, operation 76 is performed. Operation 76 selects the compensating pulse amplitude so that the figure of merit of the eye pattern observed at the receiver is maximized. Then, the method exits.

Figure 5:
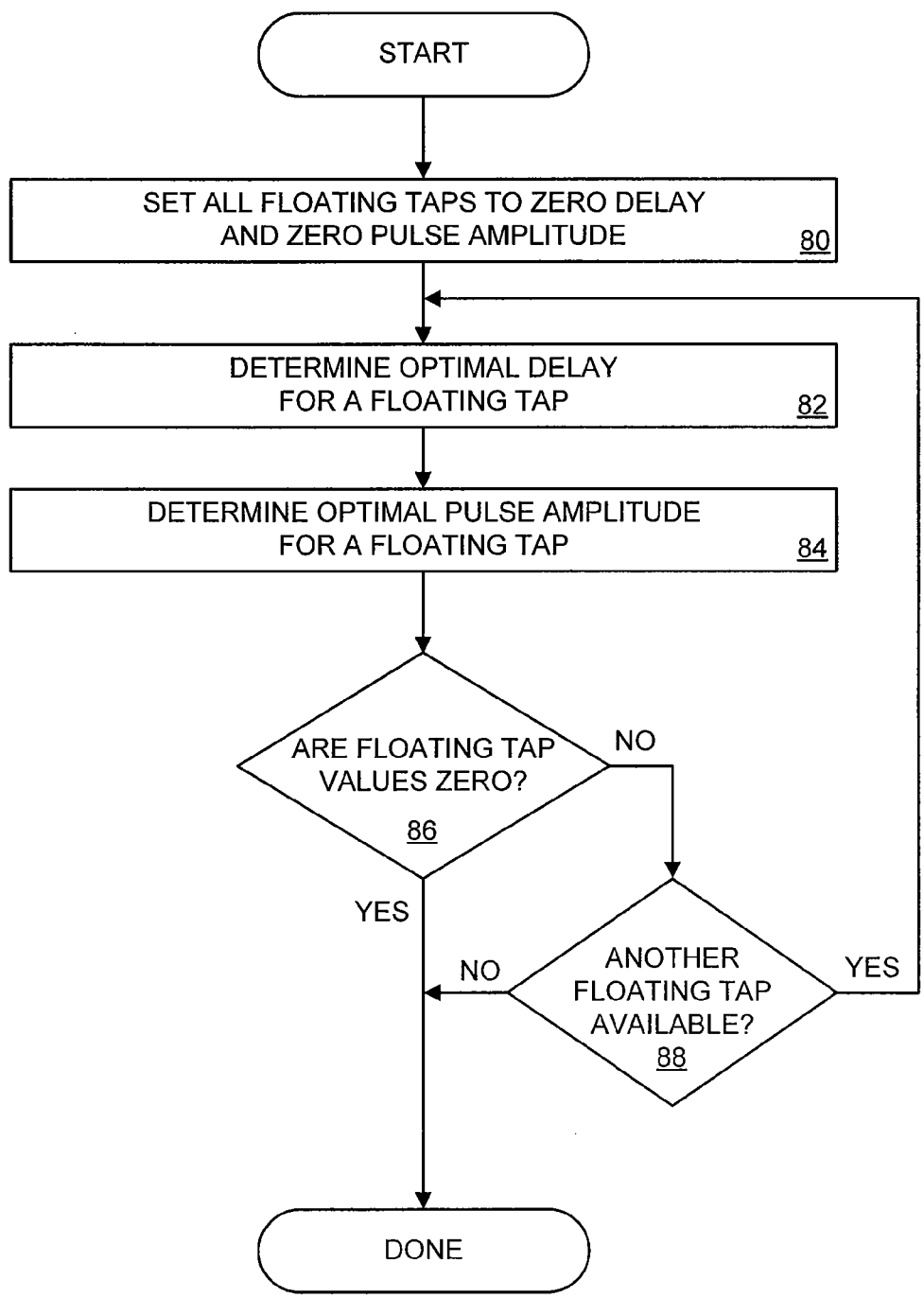
FIG. 5 depicts a flowchart illustrating one method for determining the optimal delay and pulse amplitude for a floating tap FIR equalizer with multiple floating taps.

It is to be appreciated that certain embodiments may employ more than one floating tap to compensate for multiple impedance discontinuities in the high speed serial data link. The delay and amplitude setting for each floating tap may be determined as described above. FIG. 5 depicts a flowchart illustrating one method for determining the optimal delay and pulse amplitude of each floating tap of a floating tap FIR equalizer with multiple floating taps.

Initially, operation 80 sets all floating tap delay values and pulse amplitude values to zero (i.e., all floating taps are disabled). Next, operation 82 determines the optimal delay for a floating tap. In one embodiment, the delay of the floating taps is optimized starting with the first floating tap. The optimal delay for the chosen floating tap may be determined as described above.

Then, operation 84 determines the optimal pulse amplitude for the compensating pulse generated by the floating tap. The optimal pulse amplitude may be determined as described above.

Following operation 84, operation 86 determines if the optimal delay and optimal pulse amplitude determined for the floating tap are both zero. If the delay and pulse amplitude are both zero, then there are no more impedance discontinuities (reflected energy) requiring another compensating pulse and the method ends. That is, the remaining reflected energy in the high speed serial data link channel does not produce enough noise at the receiver to make a detectable difference in the eye pattern observed at the receiver.

If operation 86 determines that the optimal delay and optimal pulse amplitude are not zero, operation 88 is performed. Operation 88 determines if another floating tap is available for compensation of another potential impedance discontinuity. If operation 88 determines that another floating tap is available, operation 82 is performed (to optimize the delay and amplitude settings of the next floating tap of the equalizer).

If operation 88 determines that all available floating taps have been utilized, the method ends. It is to be appreciated that when multiple floating taps are utilized, the first tap generally compensates the impedance discontinuity causing the largest amount of noise (inter-symbol interference) at the receiver. The next floating tap will generally be optimized to remove the reflective energy of the next impedance discontinuity causing the next largest contribution to noise at the receiver, and so forth. That is, the floating taps may be utilized to compensate other impedance discontinuities that result in sufficient noise at the receiver to cause a measurable eye degradation. Once the optimal delay and optimal pulse amplitude for a floating tap have been determined to be zero, there are no additional impedance discontinuities requiring compensation.

It is to be appreciated that process variations during manufacturing may result high speed serial data links having delay variations of ten picoseconds/inch or more. That is, the trace delay may vary from printed circuit board to printed circuit board and from trace to trace on the same printed circuit board due to manufacturing tolerances. Such variability in delay time may cause the optimal pulse delay to shift by one unit interval or more. Thus, in one embodiment, the optimal delay may be determined for each high speed serial data link.

As will recognized by those skilled in the art from the foregoing description of example embodiments of the invention, numerous variations of the described embodiments may be made without departing from the spirit and scope of the invention. Further, while the present invention has been described in the context of specific embodiments and processes, such descriptions are by way of example and not limitation. In methodologies directly or indirectly set forth herein, various steps and operations are described in one possible order or operation, but those skilled in the art will recognize that steps and operations may be rearranged, replaced, or eliminated without necessarily departing from the spirit and scope of the present invention. Accordingly, the proper scope of the present invention is specified by the following claims and not by the preceding examples.

What is claimed is:

1. A method for equalizing a reflection in a reflective high speed serial data link, comprising:
   obtaining a delay time T for a compensating pulse;
   obtaining an amplitude A for the compensating pulse; and
   transmitting the compensating pulse, having an amplitude A, at a time T after a pulse is transmitted on the reflective high speed serial data link;
   wherein obtaining the delay time T comprises;
      setting a time delay to an initial delay, the time delay related to when the compensating pulse is transmitted after the pulse is transmitted on the reflective high speed serial data link;
      transmitting a first test pattern to generate a first eye pattern at a receiver;
      determining a first set of parameters of the first eye pattern;
      determining a figure of merit for the time delay based, at least in part, on the first set of parameters; and
      setting T to the time delay having the highest figure of merit for the time delay.

2. The method of claim 1, where the operation of obtaining the delay time T further comprises:
   setting a pulse amplitude of the compensating pulse to a nominal amplitude.

3. The method of claim 1, wherein the first test pattern comprises a single pulse.

4. The method of claim 2, wherein the nominal amplitude is based, at least in part, on a maximum amplitude of the pulse transmitted on the reflective high speed serial data link.

5. The method of claim 1, wherein the first set of parameters comprises an eye width, an eye height, and an eye amplitude.

6. The method of claim 1, wherein the operation of obtaining an amplitude A comprises:
   setting a time delay to a nominal delay, the time delay related to when the compensating pulse is transmitted after the pulse is transmitted;
   setting a pulse amplitude of the compensating pulse to an initial amplitude;
   transmitting a second test pattern to generate a second eye pattern at the receiver;
   determining a second set of parameters for the second eye pattern;
   determining a figure of merit for the pulse amplitude based, at least in part, on the second set of parameters; and
   setting A to the pulse amplitude having the highest figure of merit for the pulse amplitude.

7. The method of claim 6, wherein the second test pattern comprises a single pulse.

8. The method of claim 1, wherein the compensating pulse substantially cancels a reflective energy at a transmitter and wherein the reflective energy is due to an impedance discontinuity in the reflective high speed serial data link.

9. The method of claim 1, further comprising:
   determining whether the time delay has reached a maximum value; and
   in the event that the time delay has not reached the maximum value, incrementing the time delay.

10. The method of claim 9, wherein the increment of the time delay is equal to an unit interval of the reflective high speed serial data link.

11. The method of claim 6, further comprising:
    determining whether the pulse amplitude has reached a maximum value; and
    in the event that the pulse amplitude has not reached the maximum value, incrementing the pulse amplitude.

12. The method of claim 11, wherein the increment of the pulse amplitude is equal to one percent of a maximum amplitude of the pulse transmitted on the reflective high speed serial data link.

13. An apparatus for equalizing a reflection in a reflective serial link, comprising:
    a programmable delay element having an input port and an output port, the input port in electrical communication with a transmitter output of a transmitter of a high speed serial link;
    a driver stage having a driver input and a driver output, the driver input in electrical communication with the output port of the programmable delay element and the driver output in electrical communication with a channel input of a channel of the high speed serial link; and
    wherein the programmable delay element is configured to delay a pulse transmitted by the transmitter by delay time T and forward the delayed pulse to the driver stage and wherein the driver stage is configured to transmit a compensating pulse over the channel by adjusting an amplitude of the delayed pulse;
    the delay time T determined by:
       setting a time delay to an initial delay, the time delay related to when the compensating pulse is transmitted after the pulse is transmitted;
       transmitting a test pattern to generate an eye pattern at a receiver of the high speed serial link;
       determining a set of parameters of the eye pattern;
       determining a figure of merit for the time delay based, at least in part, on the set of parameters; and
       setting delay time T to the time delay having the highest figure of merit.

14. The apparatus of claim 13, wherein the programmable delay element is programmable in delay increments equal to a unit interval of the high speed serial link.

15. The apparatus of claim 13, wherein the channel is substantially a linear, time-invariant channel.

16. The apparatus of claim 13, wherein the compensating pulse substantially cancels a reflective energy at the transmitter and wherein the reflective energy is due to an impedance discontinuity in the high speed serial link.

17. The apparatus of claim 13, wherein a maximum delay of the programmable delay element is equal to a channel propagation delay per inch times a channel length in inches times a number of reflections to be compensated.

18. The apparatus of claim 13, further comprising:
    a second programmable delay element having a second input port and a second output port, the second input port in electrical communication with the transmitter output of the transmitter of the high speed serial link;

second driver stage having a second driver input and a second driver output, the second driver input in electrical communication with the second output port of the second programmable delay element and the second driver output in electrical communication with the channel input of the channel of the high speed serial link; and wherein the second delay element and second driver stage are operable to transmit a second compensating pulse each time a pulse is transmitted by the transmitter.

19. The apparatus of claim 18, wherein the second compensating pulse substantially cancels a second reflective energy at the transmitter and wherein the second reflective energy is due to a second impedance discontinuity in the high speed serial link.

20. A method for equalizing a plurality of reflections in a reflective high speed data serial link, comprising:

obtaining a first delay time T1 for a first compensating pulse;

obtaining a first amplitude A1 for the first compensating pulse;

transmitting the first compensating pulse, having an amplitude A1, at a time T1 after a pulse is transmitted on the reflective high speed data serial link;

obtaining a second delay time T2 for a second compensating pulse;

obtaining a second amplitude A2 for the second compensating pulse; and transmitting the second compensating pulse, having an amplitude A2, at a time T2 after the pulse is transmitted on the reflective high speed data serial link;

wherein obtaining the delay time T1 comprises:

setting a time delay to an initial delay, the time delay related to when the compensating pulse is transmitted after the pulse is transmitted on the reflective high speed data serial link;

transmitting a test pattern to generate an eye pattern at a receiver;

determining a set of parameters of the eye pattern;

determining a figure of merit for the time delay based, at least in part, on the set of parameters; and setting T1 to the time delay having the highest figure of merit.

* * * * *

UNITED STATES PATENT AND TRADEMARK OFFICE
CERTIFICATE OF CORRECTION

PATENT NO.         : 8,009,763 B2
APPLICATION NO.    : 12/061217
DATED              : August 30, 2011
INVENTOR(S)        : Gabriel Risk et al.

Page 1 of 1

It is certified that error appears in the above-identified patent and that said Letters Patent is hereby corrected as shown below:

Column 9 line 3 should read "a second driver stage having a second driver input and a".

Signed and Sealed this
Twenty-fourth Day of July, 2012

David J. Kappos
*Director of the United States Patent and Trademark Office*